United States Patent [19]

Lasdon et al.

[11] Patent Number: 5,876,781
[45] Date of Patent: *Mar. 2, 1999

[54] LOW FAT PEANUT BUTTER-LIKE PRODUCT BEING SHELF STABLE AT ROOM TEMPERATURES AND METHOD FOR MAKING THE SAME

[75] Inventors: Lloyd Lasdon, New York; Stuart Lasdon, Baiting Hollow, both of N.Y.

[73] Assignee: Peanut Wonder Corp., New York, N.Y.

[ * ] Notice: The term of this patent shall not extend beyond the expiration date of Pat. No. 5,603,979.

[21] Appl. No.: 800,116

[22] Filed: Feb. 13, 1997

Related U.S. Application Data

[63] Continuation-in-part of Ser. No. 496,892, Jun. 30, 1995, Pat. No. 5,603,979, which is a continuation-in-part of Ser. No. 196,746, Feb. 15, 1994, abandoned.

[51] Int. Cl.$^6$ ....................................................... A23L 1/38
[52] U.S. Cl. .......................... 426/633; 426/506; 426/507; 426/518; 426/519; 426/573; 426/578; 426/658
[58] Field of Search .................................... 426/633, 506, 426/507, 518, 519, 573, 578, 658

[56] References Cited

U.S. PATENT DOCUMENTS

| | | | |
|---|---|---|---|
| 3,580,729 | 5/1971 | Darragh et al. | 99/128 |
| 3,947,599 | 3/1976 | Mitchell, Jr. | 426/250 |
| 4,113,889 | 9/1978 | Baxley | 426/509 |
| 4,814,195 | 3/1989 | Yokoyama et al. | 426/633 |
| 4,828,868 | 5/1989 | Lasdon et al. | 426/633 |
| 4,871,566 | 10/1989 | Farnum et al. | 426/632 |
| 4,891,235 | 1/1990 | Mizuguchi et al. | 426/281 |
| 4,938,987 | 7/1990 | Gannis et al. | 426/632 |
| 4,973,491 | 11/1990 | Shin et al. | 426/632 |
| 5,079,027 | 1/1992 | Wong et al. | 426/633 |
| 5,230,919 | 7/1993 | Walling et al. | 426/633 |
| 5,240,734 | 8/1993 | Izzo et al. | 426/633 |
| 5,302,409 | 4/1994 | Franklin | 426/633 |
| 5,366,754 | 11/1994 | Rudan et al. | 426/633 |
| 5,591,477 | 1/1997 | Boyce et al. | 426/633 |

OTHER PUBLICATIONS

Potter, Norman N. entitled "Food Science"—Third Edition A.V.I (1984).

*Primary Examiner*—Helen Pratt
*Attorney, Agent, or Firm*—Norman E. Lehrer; Franklyn Schoenberg

[57] ABSTRACT

A water-based, low fat, peanut butter-like product is provided having a pleasing texture and mouth-feel which is shelf stable at room temperatures as well as a method for producing the same. The peanut butter-like product includes defatted peanut flour, water, a humectant, a soluble salt, a gum, at least one syrup which can bean ingredient corn, malt, rice and potato syrup, at least one ingredient which is a modified food starch, a maltodextrin and a tapioca dextrin, and conventional peanut butter. The peanut butter-like product has a water activity in the range of 0.75 to 0.85 and has 70 to 95% less fat than conventional peanut butter.

18 Claims, No Drawings

5,876,781

LOW FAT PEANUT BUTTER-LIKE PRODUCT BEING SHELF STABLE AT ROOM TEMPERATURES AND METHOD FOR MAKING THE SAME

CROSS-REFERENCE TO A RELATED APPLICATION

This application is a continuation-in-part of prior application Ser. No. 496,892 filed Jun. 30, 1995 now U.S. Pat. No. 5,603,979 which is a continuation-in-part of prior application Ser. No. 196,746, filed Feb. 15, 1994 now abandoned.

BACKGROUND OF THE INVENTION

The present invention relates to a low fat peanut butter-like product and, more particularly, to such a low fat peanut butter-like product that is shelf stable at room temperatures. The present invention also relates to a method for producing the above low fat peanut butter-like product.

Peanut butter is one of the most popular foods in American diet. It is enjoyed for its rich flavor and unique texture and mouth feel. While peanut butter is generally a healthy food, it is high in both fat and calories. A 32 gram portion of conventional peanut butter typically contains about 190 calories, at least 70 percent of which are from fat. For many people who are obese or who have medical problems, low calorie, low fat diet are imperative. Further, it is well documented that most of the U.S. population consumes too much fat and many people who do not have medical problems nonetheless choose to reduce their fat intake.

Some reduced calorie and reduced fat peanut and peanut flour products have been created. In these products, calories are reduced by partially removing fats from the peanuts or peanut flours. Unfortunately, this means of caloric reduction sacrifices certain desirable sensory properties. For example, the reduced fat peanut flours described in U.S. Pat. Nos. 4,113,599 and 3,947,599 are very bland and almost tasteless. Further, these products are typically dry, generally having a water content of under 5 percent by weight. As a consequence, the use of these products has been limited to base protein materials which are used in the production of other food products.

U.S. Pat. No. 4,828,868 ("the '868 patent"), issued to the present inventors on May 9, 1989 and incorporated by reference into this specification, discloses a low fat (70–95% less fat than conventional peanut butter), low calorie peanut butter type product of processed defatted peanut flour and water (plus other ingredients). The product of the '868 patent is not shelf stable at room temperatures, however, and requires refrigeration during all stages of storage after packaging, both before and after opening.

Since consumers are accustomed to conventional peanut butter being marketed on unrefrigerated grocery shelves and being storable for an extended period at home without refrigeration, it is desirable from a marketing standpoint that a low fat, low calorie peanut butter-like product be similarly shelf stable at room temperatures.

The book, *Food Science*, by Norman N. Potter, Third Edition, A.V.I.(1984) describes the term "water activity level". Qualitatively, water activity is a measure of unbound, free water in a system that is available to support biological and chemical reactions. Since water activity is not the same as absolute water content, two foods with the same water content can have very different water activities. That is, the water activity level depends on the degree to which water is free or otherwise bound to food constituents. When a food is in moisture equilibrium with its environment, the water activity of the food will be quantitatively equal to the relative humidity in the head space of the container divided by 100.

In general, as the water activity ($A_w$) of a food product increases, its shelf life decreases. That is, the food product becomes more susceptible to mold, fungus, and bacterial growth as the water activity increases. The U.S. Food and Drug Administration defines a low acid food product with a pH of greater than 4.6 as "shelf stable" if it has a water activity of 0.85 or less. All of the products described in the '868 patent have water activities over 0.95 and usually over 0.97.

Moreover, besides requiring constant refrigeration (both before and after opening), the peanut butter-like products made in accordance with the '868 patent lack the rich taste and desirable mouth feel that typically characterize real peanut butter. This is due in part to the peanut ingredient disclosed in the '868 patent being defatted peanut flour. Defatted peanut flours are relatively bland and deliver limited peanut flavor.

In order to improve the flavor and mouth feel of the peanut butter-like products made in accordance with the '868 patent, natural peanut butter was added to the product in quantities sufficient to increase the sensory qualities but to still permit the product as a "low fat product". This proved to be unacceptable as the addition of conventional peanut butter to the product having a water activity in excess of 0.95 resulted in the rapid deterioration of the flavor and texture of the product.

Recently, there have been developed reduced fat peanut butter-like products containing 10%–30% less fat than conventional peanut butter and middle range peanut butter-like products containing 30%–50% less fat than conventional peanut butter. Some of these products have relatively low water activities and thereby acceptable shelf stability. For example, U.S. Pat. No. 5,240,734 discloses such a reduced fat peanut butter-like composition that has a water activity which is satisfactory for shelf stability. The composition includes peanut butter in the amount of 50% by weight. Accordingly, while the composition has less fat than conventional peanut butter, it still does not approach the FDA requirements for a low fat product. Specifically, the FDA requires such a product to contain 3.0 or less grams of fat per 32 gram serving or at least 80–95% less fat than conventional peanut butter.

U.S. Pat. No. 5,366,754 is directed to a reduced fat peanut butter-like product and a method of making the same. This patent suggests that it provides a method for producing a peanut butter-like product that has a low fat content and a water activity of 0.91 after pasteurization. However, the peanut raw materials utilized to make this "low fat" product are not commercially available. Further, a water activity level of 0.91 reported for that product does not denote a shelf stable product according to U.S. FDA standards.

SUMMARY OF THE INVENTION

The present inventors have made several important discoveries. They found that reducing the water activity of processed low fat peanut flour and water products to 0.85 or lower by using increased levels of sugars, salts, and certain other compounds (such as glycerine, sorbitol and other humectant compounds) makes a resultant product which is shelf stable as well as having an extremely low fat content.

The present inventors also learned that by hydrating gums, such as Carrageenan, Guar, Locust Bean or Xanthan with a maltodextrin and/or certain modified food starches first in water and then with sugar syrups and humectants at temperatures greater than 170° F., the water activities of the low fat peanut flour and water products, to which such hydrated gum compositions are added, are further reduced. Furthermore, these gums, maltodextrins, and modified food starches in proper combinations, make the texture and spreadability of the ultimate products more like conventional peanut butter.

The present inventors further discovered that a low fat peanut premix resulting from processing defatted peanut flours, sugars, salts, various gums and water and having a water activity of 0.85 or lower in accordance with the present invention is compatible with conventional peanut butter. That is, by reducing the water activity to 0.85 or below, the low fat premix (containing from 15% to as much as 40% water) can be blended with certain proportions of conventional peanut butter without loss of the flavor of the added peanut butter. The addition of conventional peanut butter improves the flavor, texture, and mouth feel, and the blended combinations now constitute a very appealing low fat peanut butter-like alternative that has an acceptably long shelf life. Conventional peanut butter, as set forth by the FDA, includes products which contain at least 90% peanuts.

As a result of these discoveries, the improved water based, low fat peanut premix of the present invention with water activity reduced to a level of 0.85 or less (as herein described) and a fat content of 95% or less than conventional peanut butter can be blended with certain proportions of conventional peanut butter to create a range of low fat combinations (70–95% less fat than conventional peanut butter). The fat content in the resultant combinations depends on the amount of conventional peanut butter that is blended with the premix products.

Accordingly, the present invention provides a low fat peanut premix and a low fat peanut butter-like product (i.e., the low fat peanut premix mixed with conventional peanut butter), each having a water activity of 0.85 or less, and in particular, from 0.75 or 0.80 to 0.85.

In a preferred embodiment, the low fat peanut butter-like product, derived from the low fat peanut premix, of the present invention will contain from 5 to 30 percent conventional peanut butter by weight and more preferably, about 10 to 20 percent conventional peanut butter by weight. These low fat peanut butter-like products have 70 to 95 percent less fat than conventional peanut buffer and water activities of 0.85 or less.

The low fat peanut butter-like product of the present invention typically includes:
commercially available defatted peanut flour containing from 5–15% fat;
water;
glycerine and/or sorbitol;
a sugar syrup;
at least one of corn, malt, rice, and potato syrup (all having a D.E. of less than 30°);
salt;
from 5 to 30 percent conventional peanut butter by weight (and more preferably from about 10–20 percent conventional peanut butter by weight);
a pigment such as calcium carbonate or titanium dioxide;
at least one of a modified food starch, a maltodextrin (or a tapioca dextrin), and gums such as Carrageenan, Guar, Locust Bean, and/or Xanthan.

DETAILED DESCRIPTION OF THE PREFERRED EMBODIMENT

Conventional peanut butter consists of a mixture of finely ground roasted peanuts, sugar, salt and optionally, stabilizers. It is made by roasting and grinding peanuts. Conventional peanut butters possess a pleasing texture and mouthfeel. Stabilizers are typically added to prevent oil from separating.

In the following, the term "low fat peanut premix" will refer to a product which has 95% or less fat than conventional peanut butter and has a water activity of 0.85 or less. The term "low fat, peanut butter-like product" will refer to a product which is obtained by blending the low fat peanut premix with conventional peanut butter and which combination has from 70 to 95% less fat than conventional peanut butter and preferably 3.0 grams or less of fat per serving portion (about 32 grams). The peanut butter-like product has a water activity of 0.85 or less and preferably from 0.75 or 0.85.

In general, as the water activity of a food product increases, its shelf life decreases. That is, as the water activity increases, the product becomes more susceptible to mold, fungus, and bacterial growth. The U.S. Food and Drug Administration (FDA) has defined a low acid food product with a pH of greater than 4.6 as "shelf stable" if it has a water activity of 0.85 or less. Known low calorie, low fat peanut butter-like products, such as the one described in the '868 patent, are not shelf stable at room temperature since their water activities are greater than 0.85. A typical product formulation for the '868 patent is set forth in TABLE I.

TABLE I

| INGREDIENT | AMOUNT |
| --- | --- |
| Peanut Flour | 9.00 lbs. |
| Water | 13.50 lbs. |
| Corn Syrup | 6.75 lbs. |
| Molasses | 1.875 ozs. |
| Xanthan Gum | 0.57 ozs. |
| Lecithin | 0.86 ozs. |
| Sugar | 12.00 ozs. |
| Salt | 6.75 ozs. |
| Coloring | 0.93 ozs. |
| Potassium Sorbate | 0.54 ozs. |
| Flavorings | 2.40 ozs. |

This formulation yields a product having an approximate water activity of 0.97 and therefore requires refrigeration to resist biological degradation.

The low fat peanut butter-like products of the present invention each have a water activity of 0.85 or less, and in particular, from 0.75 or 0.80 to 0.85. This low water activity level is accomplished by providing formulations having increased levels of water soluble ingredients, such as, for example, sugars and salts, beneficial humectant compounds, such as glycerine and sorbitol, and gums such as Carrageenan, Guar, Locust Bean and/or Xanthan as well as following the processing steps as herein described in detail.

The defatted peanut flour suitable for use in the products of the present invention may be any of several such commercially available flours and may have as little as about 3% to about 35% fat. In the preferred embodiment, however, the flour has from 5 to 15% fat.

In particular, the low fat peanut premix product of the present invention includes water in an amount of from about 15% to about 50%, and defatted peanut flour (5–15% fat) in an amount of from about 5% to about 20%. Also included are salt, such as sodium chloride, in an amount of from 1.2% to about 2.0%; gums, such as Carrageenan, Guar, Locust Bean, Xanthan, Pectin and/or Carboxymethylcellulose, in an amount of from about 0.1–2.5%; pigments such as calcium carbonate and/or titanium dioxide in an amount of from about 0.1% to 1.1%; a syrup ingredient, such as corn, malt, potato or rice, with a D. E. (dextrose equivalence) of 30° or less in an amount of from about 15% to about 40%; at least one of molasses, sucrose either dry or as syrup in an amount from about 2% to about 12%; a humectant such as glycerine and/or sorbitol in an amount from of from about 2% to about 10%; and at least one of a modified food starch, a maltodextrin or a tapioca dextrin in an amount of about 0.5 to about 6.0%.

The modified food starches utilized have the property of being fat mimetics. The use of such modified food starches yields a finished product which has a desirable, fat-like, sticky mouth feel that is very similar to full fat (conventional) peanut butter.

Sweetening agents such as sucrose, fructose, glucose and/or honey, preferably in syrup form, can also be added in an amount of from about 1 to about 5.5%. These sweetening agents may be used in place of molasses or in addition to the same. Additional optional ingredients include anti-oxidants, such as sodium ascorbate and or ascorbic acid, in an amount of from about 0.0005% to about 0.005% to improve stability.

In an alternate embodiment of the invention, polydextrose, in either dry form or in solution, can be utilized as a replacement for other active ingredients, some of which are used to reduce the water activity, namely the molasses, sugar syrup, glycerine and/or sorbitol. Polydextrose is a synthesized sugar polymer which has a calorie content of 1.0 calories per gram. Moreover, polydextrose has a very low level of sweetness and, when added in amounts of from about 2% to about 15% in place of about equivalent amounts of the other sweetener ingredients, the sweetness of the resultant peanut butter product of this invention is beneficially reduced. Adding polydextrose in the range of 2% to 15% poses no threat of digestive disturbance, although in larger amounts it may.

Due to its reduced water activity level, the low fat peanut premix of the present invention can be blended with prescribed amounts of conventional, generally finely ground, peanut butters (either natural or stabilized) as both a flavoring and texturing agent. That is, by blending from about 5 percent to about 30 percent, preferably from about 10 to about 20 percent, of a conventional peanut butter with the low fat peanut premix, excellent peanut butter-like flavors and textures are attained. Moreover, such a blend has 70 to 95 percent less fat by weight than conventional peanut butter while at the same time having a water activity level of 0.85 or less. An emulsifier such as lecithin in an amount of 0.2% to about 2.0% may be added to help unite the oil based system (conventional peanut butter) with the water based, low fat, peanut premix. Oil or water based flavors and tocopherols (oil soluble antioxidants) may also be added.

The low fat, low water activity peanut butter formulations of the invention are preferably processed in the following manner. The gums may be pre-hydrated in order to improve the viscosity and texture of the final product as well as further reduce the water activity thereof. This is accomplished by first feeding the NaCl, the gum(s), and the pigment(s), into a heated jacketed mixing tank. The water is then added and the mixture (hereinafter "mixture 1") is vigorously agitated for a time (typically from about 15 to about 30 minutes) sufficient to blend the ingredients. During the blending step, mixture 1 is heated to a temperature of from at least about 170° F. to about 195° F. to promote complete solution and hydration. It should be noted that some gums such as Xanthan do not require pre-hydration and can be added directly to the other ingredients and cooked with them.

The syrups (malt, corn, potato and/or rice); the molasses, the polydextrose, glycerine and/or sorbitol; the modified food starch and/or dextrins; and the peanut flour are combined and blended in a heated jacketed mixing tank to prepare mixture 2. During this blending step, mixture 2 is heated to a temperature sufficient to make the same fluid, generally about 160° F. to 190° F. While the temperature is maintained, mixtures 1 and 2 are fed into a multistage in-line high shear homogenizing mixer, such as a Ross or Greerco, in order to mill and/or homogenize the same until a smooth product having a creamy mouth feel and a particle size of generally no larger than 50 mesh results. This resultant product is the low fat peanut premix. It should be noted that water soluble anti-oxidants like ascorbic acid and/or sodium ascorbate (in the amount from about 0.0005–0.005%) can be added to provide stability.

The low fat peanut premix is then transferred to a reactor vessel such as a kettle provided with a scraped surface agitator or through a scraped surface heat exchanger. The peanut butter, peanut butter flavor, tocopherols and optionally lecithin ("mixture 3") are then combined with the low fat peanut premix in the reactor vessel and aggressively blended at a temperature of 180° F. to 190° F. for about 1 to 10 minutes to obtain a low fat peanut butter-like product which is smooth, has a creamy mouth feel and has a particle size of preferably no larger than 200 mesh. More specifically, the resultant low fat peanut premix is blended with an amount of 5 to 30% by weight and preferably from about 10% to 20% by weight of conventional peanut butter to provide a low fat (70 to 95% less fat than conventional peanut butter), peanut butter-like, blended product that is shelf stable (before opening), and preferably contains 3.0 grams or less of fat per serving. Finally, the low fat peanut butter-like product is hot packed in suitable containers.

The addition of the conventional peanut butter improves the flavor, texture and mouth feel of the product. The lecithin (although not always necessary) helps unite the oil based ingredients, the peanut butter and peanut butter flavor, with the water based premix.

This low fat peanut butter-like product is compatible with and can be blended with fruit preserves, etc. as set forth in U.S. Pat. No. 5,034,242 (incorporated herein by reference).

A specific example of a formula for low fat, peanut butter-like, blended product according to the present invention is set forth in TABLE II.

TABLE II

| INGREDIENT | PERCENT BY WEIGHT |
| --- | --- |
| Defatted Peanut Flour | 12.25 |
| Water | 22 |
| Corn, Malt, Potato or Rice Syrup (26° DE) | 25 |
| Polydextrose | 8 |
| Glycerine | 5 |
| Sorbitol | 5 |
| Pigment | 0.25 |
| NaCl | 1.5 |
| Modified Food Starch, Maltodextrin and/or Tapioca dextrin | 4.5 |
| Gums | 1 |
| Peanut Flavors | 1 |
| Lecithin | 0.5 |
| Peanut Butter | 14 |

This example is merely illustrative, and is not intended to limit the possible formulations within the scope of the present invention.

Many variations and modifications of the product and process of the present invention will be suggested to one of ordinary skill in the art upon a reading of the specific embodiments which are described in this specification. The scope of this invention is, however, not limited to the specific embodiments described herein. The present invention is defined and limited only by the claims which conclude this specification.

What is claimed is:

1. A water based, low fat peanut butter-like product, said peanut butter-like product comprising peanut butter in an amount from about 5% to about 30% by weight, water in an amount of from about 15% to about 50% by weight, and from about 5% to about 20% by weight of defatted peanut flour having from about 5% to about 35% fat, said peanut butter-like product being a low fat product having from about 70% to 95% less fat than conventional peanut butter, a water activity of no more than 0.85 and is shelf stable at room temperature without refrigeration.

2. The peanut butter-like product of claim 1 which comprises from about 10% to 20% peanut butter by weight.

3. The peanut butter-like product of claim 1 wherein said defatted peanut flour has from about 5% to about 15% fat.

4. The peanut butter-like product of claim 1 having no more than about 3.0 grams of fat in a 32 gram portion.

5. A water based, low fat, peanut premix product comprising:
    defatted peanut flour in an amount of from about 5% to about 20% by weight, said defatted peanut flour having from about 5% to about 35% fat;
    water in an amount of from about 15% to about 50% by weight;
    a soluble salt in an amount of from about 1.2% to about 2.0% by weight;
    a gum in an amount of from about 0.1% to about 2.5% by weight;
    at least one ingredient selected from the group consisting of corn syrup, malt syrup, rice syrup and potato syrup in an amount of from about 15% to about 40% by weight;
    at least one ingredient selected from the group consisting of molasses, sucrose and invert sugar in an amount of from about 2% to about 12% by weight;
    a humectant in an amount of from about 2% to 10% by weight;
    said product having a water activity in the range of from about 0.75 to 0.85.

6. The peanut premix product of claim 5 wherein said defatted peanut flour has from about 5% to about 15% fat.

7. The peanut premix product of claim 5 wherein said humectant is at least one of glycerine and sorbitol.

8. The peanut premix product of claim 5 further including a pigment in an amount of about 0.01% to 1.1% by weight.

9. The peanut premix product of claim 5 having a particle size of no larger than approximately 200 mesh.

10. The peanut premix product of claim 5 which is a peanut butter-like product further comprising conventional peanut butter in an amount of from about 5.0 to 30% by weight, said peanut butter-like product having from about 70% to about 95% less fat than conventional peanut butter.

11. The peanut premix product of claim 10 further including lecithin in an amount of from about 0.2% to about 2.0% by weight.

12. The peanut premix product of claim 11 having up to about 3.0 grams of fat in a 32 gram portion.

13. A water based, low fat, peanut premix product comprising:
    defatted peanut flour in an amount of from about 5% to about 20% by weight, said defatted peanut flour having from about 5% to about 15% fat;
    water in an amount of from about 15% to about 50% by weight;
    a soluble salt in an amount of from about 1.2% to about 2.0% by weight;
    a gum in an amount of from about 0.1% to about 1.0% by weight;
    at least one ingredient selected from the group consisting of corn syrup, malt syrup, rice syrup and potato syrup in an amount of from about 15% to about 40% by weight;
    at least one ingredient selected from the group consisting of molasses, honey polydextrose, sucrose(simple) and invert sugar syrup in an amount of from about 2% to about 12%;
    at least one ingredient selected from the group consisting of modified food starch, a maltodextrin and a tapioca dextrin in an amount from about 0.5% to about 6.0% by weight; and
    a humectant in an amount of from about 2% to 10% by weight;
    said product having a water activity in the range of from about 0.75 to 0.85.

14. A method for making a water based, low fat, peanut premix product having a water activity of from about 0.75 to 0.85 and having shelf stability without refrigeration comprising the steps of:
    (a) providing the following ingredients: water in an amount of from about 15% to about 50% by weight, at least one ingredient selected from the group consisting of a modified food starch, a maltodextrin, and a tapioca dextrin in an amount of from about 0.5% to about 6.0% by weight, a soluble salt in an amount of from about 1.2% to about 2.0% by weight, and at least one gum selected from the group consisting of Carrageenan, Guar, Locust Bean and Xanthan in an amount of from about 0.1%–2.5% by weight;
    (b) combining the ingredients of step (a) with vigorous agitation at a temperature of over 160° F. to 195° F. for a time necessary to hydrate said gum;
    (c) providing and admixing defatted peanut flour in an amount of from about 5.0% to about 20% by weight, at least one syrup selected from the group consisting of corn syrup, malt syrup, rice syrup and potato syrup in an amount of from about 15% to about 40% by weight, at least one ingredient selected from the group consisting of molasses, polydextrose, sucrose, and invert sugar syrup in an amount of from about 2.0% to about 12% by weight, and a humectant in an amount of from about 2.0% to about 10% by weight at a temperature sufficient to form a fluid mixture of the same;
    (d) admixing the mixture of step (c) with the mixture of step (b), and
    (e) feeding the mixture of step (d) into a particle reduction device so that the particle size of said peanut premix product is no larger than approximately 50 mesh.

15. The method of claim 14 wherein said peanut premix product has a particle size of no larger than approximately 200 mesh.

16. The method of claim 14 further including the step of blending the peanut premix product with conventional peanut butter in an amount of 5.0 to 30% by weight and lecithin in an amount from about 0.2% to about 2.0% by weight in order to obtain a low fat peanut butter-like product having 70 to 95% less fat than conventional peanut butter and a water activity from about 0.75 to 0.85.

17. A method for making a water based, low fat, peanut butter-like product having a water activity of from about 0.75 to 0.85 and having shelf stability without refrigeration comprising the steps of:

(a) providing and mixing the following ingredients: water in an amount of from about 15% to about 50% by weight, at least one ingredient selected from the group consisting of a modified food starch, a maltodextrin, and a tapioca dextrin in an amount of from about 0.5% to about 6.0% by weight, a soluble salt in an amount of from about 1.2% to about 2.0% by weight, and at least one gum selected from the group consisting of Carrageenan, Guar, Locust Bean and Xanthan in an amount of from about 0.1% to about 1% by weight;

(b) providing and mixing defatted peanut flour in an amount of from about 5.0% to about 20% by weight, at least one syrup selected from the group consisting of corn syrup, malt syrup, rice syrup and potato syrup in an amount of from about 15% to about 40% by weight, at least one ingredient selected from the group consisting of molasses, polydextrose, sucrose and invert sugar syrup in an amount of from about 2.0% to about 12% by weight, and a humectant in an amount of from about 2.0% to about 10% by weight at a temperature sufficient to form a fluid mixture of the same;

(c) admixing the mixture of step (a) with the mixture of step (b), and (d) feeding the mixture of step (c) into a particle reduction device so that the particle size of said peanut product is no larger than approximately 50 mesh.

18. The method of claim 17 further including the steps of:

providing and admixing conventional peanut butter in an amount of from about 5.0% to about 30% by weight and lecithin in an amount to about 1.0% by weight to the mixture of step (d) of claim 17, and aggressively blending the resultant mixture at a temperature of about 170° F. to about 190° F. for about 1 to 10 minutes in order to obtain said low fat peanut butter-like product.

* * * * *